United States Patent Office 2,760,444
Patented Aug. 28, 1956

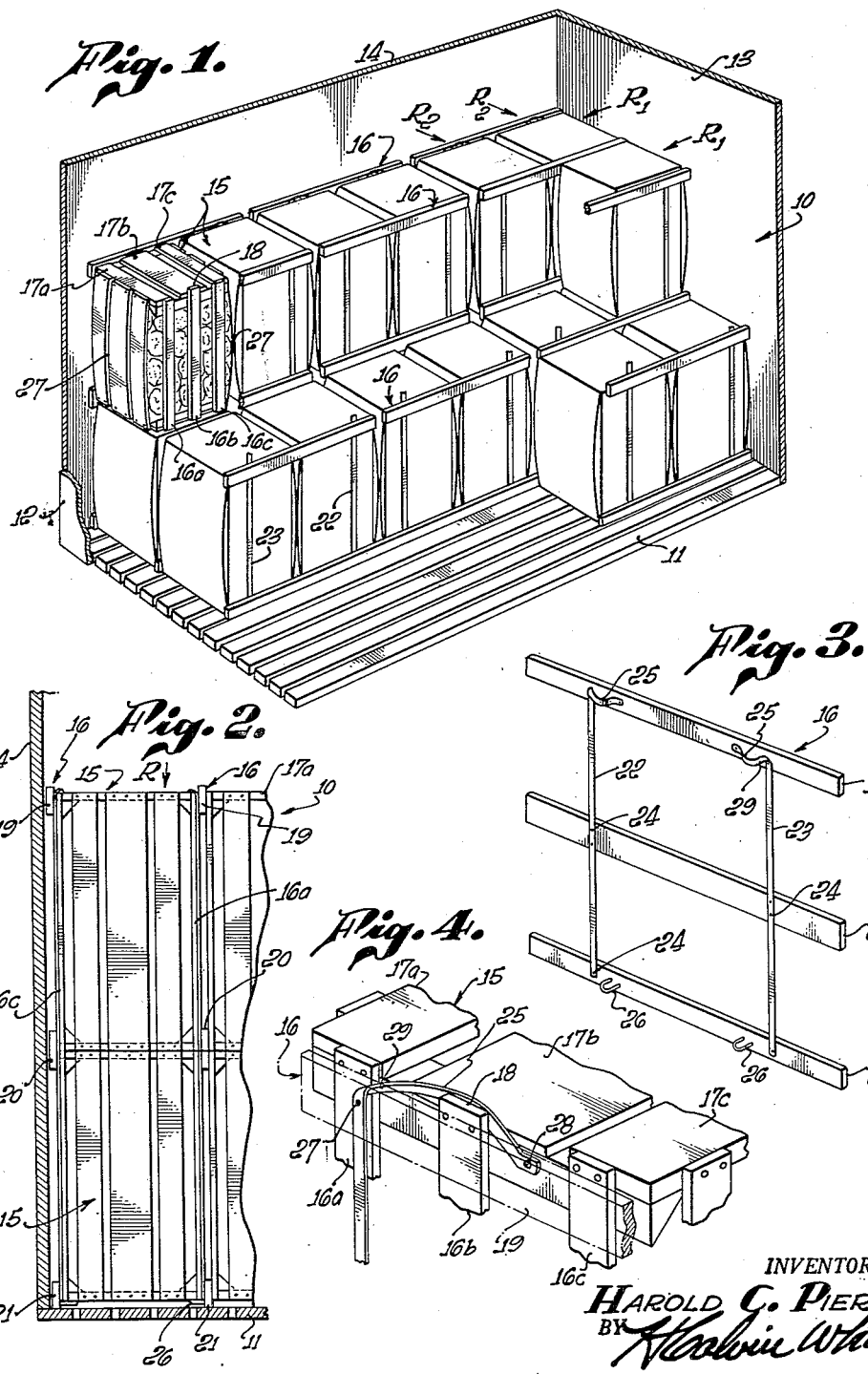

2,760,444

SUSPENSION OF SPACERS IN BOXED PRODUCE LOADS

Harold C. Pierce, Pomona, Calif.

Application February 12, 1953, Serial No. 336,529

5 Claims. (Cl. 105—367)

This invention relates to improved spacers and spacing arrangements for box car loads, and in certain respects is particularly concerned with spacers for loads formed of slatted crates, typically of the type used for shipping cantaloupe.

A major object of the invention is to provide an improved type of spacer unit adapted for use in slatted crate loads, and which is specially constructed to facilitate accurate positioning of the spacer in the load during assembly thereof. Particularly contemplated is a spacer unit including several easily handled elongated spacer members interconnected for manipulation together and adapted to be very simply suspended as a unit in active position within a load.

The ordinary slatted crate is formed in a manner such that one or more of its slats has ends projecting a short distance beyond the end walls of the crate. To facilitate positioning of the spacers in a load comprising crates of this type, or other boxes having similar projections, I have conceived the idea of forming the spacers to actually engage and be suspended from these slat ends or projections. For this purpose, I preferably provide elements carried by the spacers and forming loops receivable about the box projections, which projections may extend upwardly in a manner facilitating such suspension.

Best results are achieved where the spacers are elongated and extend horizontally at vertically spaced locations to space apart edge portions of the boxes. One of these horizontal spacers may then be suspended at spaced locations by a pair of the previously mentioned loops receivable about two box projections. One or more lower spacers may be suspended from and beneath each loop carrying spacer by one or more interconnecting elements. Preferably, the suspending loops and interconnecting elements are formed of flexible suspending straps, typically metal straps. In a two tier box load, it is desirable that three such horizontal spacers be employed, and be suspended by two spaced straps.

When a plurality of spacers are suspended in the above or a similar manner in a load, it is desirable to provide means for preventing any unwanted upward shifting movement of the spacers in the load as a result of vibration in transit. To prevent such upward movement, I form on the lower of the spacers a projection acting to extend horizontally to a location beneath an engaged box.

The above and other features and objects of the present invention will be better understood from the following detailed description of the typical embodiments illustrated in the accompanying drawing, in which:

Fig. 1 is a fragmentary perspective view of a car load embodying the invention;

Fig. 2 is an enlarged fragmentary side view of the Fig. 1 load;

Fig. 3 is an enlarged perspective view of one of the spacer units of the Fig. 1 load; and Fig. 4 is a further enlarged fragmentary perspective view of one of the upper tier boxes of the load, and showing the manner in which a spacer unit is suspended from the box.

Referring first to Fig. 1, the car load 10 is shown positioned within a conventional railroad box car, having the usual slatted floor 11, side or longitudinally extending walls 12 and 13, and end walls 14 (only one shown). The load includes a number of produce boxes 15 arranged in two superimposed tiers within the car, and alined in parallel rows R1 extending transversely across the car, and parallel rows R2 extending longitudinally of the car. Successive transverse rows of the boxes are spaced apart longitudinally of the car by a number of spacer units 16 (see Fig. 3).

The boxes 15 may typically be elongated slatted rectangular crates of the type commonly used for shipping cantaloupes and various other types of produce, and are stood on end in the load, as shown. The two vertical sides of these boxes which extend transversely of the car are formed by three parallel spaced vertically extending slats 16a 16b and 16c which connect at their upper and lower ends with three horizontal slats 17a, 17b and 17c forming the box ends. The central one of the end slats 17b is thinner than the other two slats 17a and 17c so that its outer surface lies in a plane spaced inwardly from the plane of the outer surfaces of those other two slats. All three of the side slats 16a, 16b and 16c extend at their opposite ends to the plane of the outer surfaces of end slats 17a and 17c, with the result that central slat 16b has an end portion 18 at each end projecting beyond the slat 17b to which it is connected. As will appear, these projecting portions of slat 16b are utilized to advantage for suspending the spacer units 16 in the load.

Referring now to Fig. 3, each of the spacer units 16 includes three horizontally extending vertically spaced parallel spacer members 19, 20 and 21, which are interconnected by a pair of vertically extending horizontally spaced flexible connector elements 22 and 23. The three horizontal spacer members 19, 20 and 21 extend transversely of the car between corresponding boxes in adjacent transverse box rows, to space apart longitudinally of the car upper and lower edge portions of those boxes. These three horizontal spacers (usually boards) have equal lengths, which may correspond to the combined dimensions transversely of the car of a predetermined number of the boxes 15. Preferably, the length of these members corresponds to the combined transverse dimensions of two boxes, as shown, or in certain instances three boxes.

The upper spacer member 19 is interposed between and engages and spaces apart upper edge portions of the top tier boxes. The lowermost spacer 21 of each spacer unit 16 is interposed between and engages and spaces apart the lower edge portions of adjacent lower tier boxes. The central spacer 20 vertically overlaps the lower edges of adjacent upper tier boxes, and the upper edges of adjacent lower tier boxes, and for this purpose may typically have a vertical dimension about twice as great as the vertical dimension of spacers 19 and 21. While it will of course be understood that the spacers may have any of different dimensions under varying particular circumstances, it has been found desirable in shipping conventional cantaloupe crates, to give spacers 19 and 20 a thickness of about 1" longitudinally of the car, a height or vertical dimension of about 2", and a horizontal length of about 28" (where the spacers extend across two box widths). The central spacer may be of the same size, except that its vertical dimension is desirably twice that of spacers 19 and 21.

The flexible vertically extending connectors 22 and 23 of the spacer unit may typically be formed of flexible metal straps, or other material having a similarly fixed longitudinal dimension. These metal straps are connected to spacer units 19, 20 and 21 in any suitable manner, as for instance by tacks or nails 24. The upper end portions 25 of straps 22 and 23 are turned horizontally and curved outwardly away from the spacer member 19 to form a pair of loops receivable about upwardly projecting portions 18 of box slats 16b. These straps are nailed to spacer member 19 at opposite sides of the formed loops, and the loops are spaced longitudinally of member 19 a distance corresponding to the spacing of the central vertical slats 16b of two adjacent crates. In other words, the spacing of loops 25 is substantially the same as the width of one of the crates transversely of the car.

The horizontal dimension of each of the loops 25 may be sufficiently greater than the width of upwardly projecting slat portions 18 to enable easy positioning of the loops over the slats. For this purpose, the loops' width is preferably at least about two times as great as the slat width. For example, where the slats are 1¾" wide by actual measurement, the loops may be about 4" wide. Vertical portion 22 or 23 of each strap preferably extends downwardly from the side of its upper loop portion 25 which is nearer the corresponding end of spacer 19.

The metal straps are preferably attached to spacers 19 in a manner such that one side of each loop has an upwardly inclined portion which acts as a tapering throat for facilitating the placing of loop 25 over projections 18. To form such a throat, the upwardly extending portion 22 or 23 of each strap may be fastened by a nail 27 directly against the side of spacer 19 before the upper portion is turned laterally to form the loop. When the portion 25 of the strap is then turned horizontally and nailed at an offset location 28 to spacer 19, the change in direction of the strap forms at 29, just beyond nail 27, a side portion of the loop at which the strap presents an inclined inner surface, which in extending upwardly converges toward spacer 19 and the opposite side of the loop.

The bottom spacer member 21 which rests on the floor of the car, carries two or more projections 26 extending horizontally from spacer 21 in the same direction that loops 25 extend from spacer 19. These projections may comprise nails or staples, as shown, and are positioned to be received beneath and engage the undersides of the boxes. Preferably, these projections engage the undersides of the central slats 17b at the bottoms of the boxes, and are spaced slightly above the car floor and the floor-engaging bottom edge of spacer 21, in correspondence with the slight upward spacing of slat 17b. As will be understood, the reception of projections 26 beneath the bottom boxes retains the spacer assembly against accidental upward displacement by vibration in transit. In order to permit engagement of projections 26 with central slats 17b of the bottom ends of the boxes, the projections are slightly horizontally offset with respect to loops 25 formed by the metal straps.

In assembling a load of the type shown, a first spacer assembly 16 is held in position against an end wall of the car and two superimposed pairs of boxes are then moved into position against the spacer unit. The unit is suspended from the upper pairs of boxes by reception of loops 25 about upwardly projecting slat portions 18, and projections 26 carried by bottom spacer 21 of the unit are received beneath the slightly elevated slats 17b at the bottoms of the bottom pair of boxes. Other spacer units may then be moved into position against the car wall, and further boxes placed against those units. After a complete transverse row R1 of boxes has been moved into position, three additional spacer units may be suspended from the forward sides of those boxes by reception of their loops 25 about the box projections, and after assuring that projections 26 of the bottom spacers are received beneath the bottom boxes, a second row of boxes may be moved into position in front of the second row of spacer units. The car may be filled from both of its ends in this manner, and then braced in any suitable manner at its center. The result is a very well braced overall load, in which successive transverse rows of boxes are spaced apart longitudinally of the car to provide air circulation spaces therebetween. The slatted vertical box sides 27 which extend longitudinally of the car are outwardly bulged or crowned as shown, to thus also provide air circulation spaces between those box sides communicating with the spaces between the transverse box rows.

I claim:

1. A boxed produce load comprising boxes arranged in stacked rows extending longitudinally and transversely within a car, a pair of vertically spaced parallel horizontally extending spacers interposed between and spacing apart corresponding boxes in adjacent rows thereof, means interconnecting said spacers, means suspending the spacers from said boxes, and a projection extending horizontally from a lower one of said spacers to a location beneath one of said boxes to restrain upward movement of the spacers.

2. A boxed produce load comprising boxes arranged in stacked rows extending longitudinally and transversely within a car, a pair of vertically spaced parallel horizontally extending spacers interposed between and spacing apart corresponding boxes in adjacent rows thereof, said boxes having projections extending upwardly at the tops thereof and each terminating in an upper free end portion which is unattached to the rest of the corresponding box except through the projection itself, an element carried by an upper one of said spacers forming a loop which is attached at its opposite ends to said one spacer and extends about one of said box projections to suspend said upper spacer therefrom, a member extending vertically between and connected to said spacers and suspending the lower one from the upper one, and a projection extending horizontally from said lower spacer to a location beneath a box engaged thereby to restrain upward movement of the spacers.

3. A boxed produce load comprising boxes arranged in stacked rows extending transversely and longitudinally within a car, said boxes having side slats having upper free ends projecting upwardly at the tops of the boxes, a pair of parallel horizontally extending spacers interposed at vertically spaced locations between and spacing apart corresponding boxes in two adjacent box rows, a pair of flexible straps connected to an upper one of said spacers at horizontally spaced locations and forming a pair of loops each attached at its opposite ends to said one spacer and extending about said upper ends of a pair of said slats to suspend said one spacer therefrom, said straps extending downwardly and connecting to the lower of said spacers at spaced locations to suspend said lower spacer from the upper one, a third horizontal spacer parallel to said first mentioned pair and spaced beneath said lower one of the pair, said straps being connected to said third spacer to suspend it from the other two spacers, and a projection carried by said third spacer and extending horizontally to a point beneath a box engaged thereby to prevent upward movement of the spacers, the upper of said pair of spacers being interposed between upper edge portions of boxes in an upper tier thereof, the lower of said pair of spacers being interposed between lower edge portions of said upper tier boxes and between upper edge portions of boxes in a lower tier, and said third spacer being interposed between lower edge portions of said lower tier boxes.

4. For use in a boxed produce load comprising boxes having projections each terminating in an outer free end portion which is unattached to the rest of the corresponding box except through the projection itself, said boxes being arranged in stacked rows extending transversely and longitudinally in a car; two elongated generally parallel spacer members to be interposed between and space apart adjacent boxes in said load, an element carried by a first of said spacers and forming a loop which is attached at its opposite ends to the spacer and is adapted to extend about said projection on one of the boxes to suspend said first spacer therefrom, an element extending between and interconnecting said spacers and suspending the second spacer from the first, and a projection extending laterally from said second spacer and adapted to be received beneath a box engaged thereby to restrain upward movement of the spacers.

5. For use in a boxed produce load comprising boxes having projections each terminating in an outer free end portion which is unattached to the rest of the corresponding box except through the projection itself, said boxes being arranged in stacked rows extending transversely and longitudinally in a car; a pair of spaced elongated parallel spacer members adapted to extend horizontally between and spaced apart adjacent boxes in the load, a pair of flexible straps connected to an upper one of said spacers at spaced locations and forming spaced loops each of which is attached at its opposite ends to said upper spacer, said loops being adapted to extend about a pair of said box projections and suspend said upper spacer therefrom, said straps having portions extending downwardly to and connecting to the lower spacer to suspend it from the upper one, a third elongated spacer extending parallel to and spaced beneath said pair of spacers and connected to said straps for suspension thereby, and a projection extending horizontally from said third spacer and receivable beneath a box engaged thereby.

References Cited in the file of this patent

UNITED STATES PATENTS

| | | |
|---|---|---|
| 2,156,866 | Pierce | May 2, 1939 |
| 2,177,076 | Pierce | Oct. 24, 1939 |
| 2,474,949 | Lewis et al. | July 5, 1949 |